(12) United States Patent
Reinhardt (10) Patent No.: US 9,026,834 B2
(45) Date of Patent: May 5, 2015

(54) COMMUNICATION ENTITY WITH TIMING GENERATOR COUPLED VIA A DIGITAL PROTOCOL TO SAMPLE-DRIVEN FURTHER COMMUNICATION ENTITY

(75) Inventor: Steffen Reinhardt, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 415 days.

(21) Appl. No.: 13/577,345

(22) PCT Filed: Feb. 11, 2010

(86) PCT No.: PCT/EP2010/051746
§ 371 (c)(1),
(2), (4) Date: Aug. 14, 2012

(87) PCT Pub. No.: WO2011/098132
PCT Pub. Date: Aug. 18, 2011

(65) Prior Publication Data
US 2012/0328032 A1    Dec. 27, 2012

(51) Int. Cl.
*H04L 27/00* (2006.01)
*G06F 11/00* (2006.01)
*H04J 3/06* (2006.01)
*G06F 3/12* (2006.01)

(52) U.S. Cl.
CPC ............... *H04J 3/0685* (2013.01); *G06F 3/126* (2013.01); *G06F 3/1209* (2013.01)

(58) Field of Classification Search
CPC ............................. G06F 3/1209; G06F 3/126
See application file for complete search history.

(56) References Cited

U.S. PATENT DOCUMENTS

| 8,254,365 B2* | 8/2012 | Storm et al. ................. 370/349 |
| 2007/0071078 A1 | 3/2007 | Yoshida et al. |
| 2008/0186146 A1 | 8/2008 | Tripathi et al. |
| 2009/0122844 A1* | 5/2009 | Wenzel et al. ................ 375/219 |
| 2010/0215133 A1* | 8/2010 | Stebbings et al. ............ 375/354 |

FOREIGN PATENT DOCUMENTS

| JP | 2004104281 A | 4/2004 |
| WO | 2006027025 A1 | 3/2006 |
| WO | 2008080634 A1 | 7/2008 |

OTHER PUBLICATIONS

Mobile Industry Processor Interface. "MIPI Alliance Specification for Dual Mode 2.5G/3G Baseband/RFIC Interface." Version 3.09.04—Apr. 1, 2008, MIPI Board Approved Jul. 2, 2008.

(Continued)

*Primary Examiner* — Zahid Choudhury
(74) *Attorney, Agent, or Firm* — Coats & Bennett, PLLC (57) ABSTRACT

An embodiment of the invention provides a communication device (100) for processing data samples and comprises a communication entity (102) and a further communication entity (104) communicatively coupled to the communication entity (102) with a digital interface. The communication entity (102) comprises a timing generation unit (106) adapted for generating real-time related timing information for operating hardware components of the communication entity (102) when processing data samples. The further communication entity (104) is adapted for operating hardware components of the further communication entity (104) in a sample-driven way when processing data samples.

15 Claims, 6 Drawing Sheets

(56) References Cited

OTHER PUBLICATIONS

Mobile Industry Processor Interface. "Draft MIPI Alliance Specification for DigRFSM v4." Draft Version 0.70.00 Revision 0.05—May 7, 2009.

Fogg, A. "DigRF Baseband / RF Digital Interface Specification." Logical, Electrical and Timing Characteristics, EGPRS Version, Version 1.12, Feb. 20, 2004 [Retrieved on Feb. 20, 2004]. Retrieved from the Internet: <URL: http://146.101.169.51/DigRF%20Standard%20v112.pdf>.

* cited by examiner

COMMUNICATION ENTITY WITH TIMING GENERATOR COUPLED VIA A DIGITAL PROTOCOL TO SAMPLE-DRIVEN FURTHER COMMUNICATION ENTITY

TECHNICAL FIELD

The invention relates to a communication device for processing data samples.

The invention also relates to a method of processing data samples by a communication entity and a further communication entity communicatively coupled to the communication entity in accordance with a digital protocol.

Beyond this, the invention relates to a program element.

The invention further relates to a computer-readable medium.

BACKGROUND

The Digital Radio Frequency (DigRF) protocol or standard specifies a digital serial interface, which replaces the analog interface in previous generation mobile handset architectures. The DigRF standard supports a variety of 3GPP air standards. The physical layer of DigRF standard connects a radio frequency integrated circuit (RFIC) and a base band integrated circuit (BBIC) via an interface. RFIC and BBIC may be configured as Application Specific Integrated Circuits (ASIC). Independent transmit (Tx) and receive (Rx) differential signal pairs allow for concurrent bi-directional communication between an RFIC and a BBIC.

Many platforms for mobile devices consist of two ASICs regarding the access part of the platform, namely the RFIC, which is responsible for converting the signal from base band to an analog RF signal and vice versa and the BBIC which contains the signal processing for providing a standard conform signal to the transmitting part of the RFIC or receiving a noisy signal and reconstruct the transmitted signal as accurate as possible.

To avoid mixed signal processing in the base band an often used approach is to use a digital interface between RFIC and BBIC with a minimized number of pins due to the fact that especially the RFIC package size is driven by pin count.

The most common standard for a digital interface between RFIC and BBIC is the DigRF standard specified by the Mobile Industry Processor Interface (MIPI) Alliance. This standard is available in version v3.09—in the following called DigRF v3 and in the latest version 4—in the following called DigRF v4. The interface is based on a serial high speed transmission over differential lines.

There could be proprietary solutions for digital interfaces between RFIC and BBIC, which face the same general characteristics which affect the platform design, which are especially:

Reference clock generation, controlling and distribution within platform

Functional split regarding real-time control, time accurate controlling of the RFIC and the BBIC and synchronization with respect to timing Functional split between RFIC and BBIC regarding data processing, control loops and real-time control The first two items will be explained below in more detail.

Figure 5:
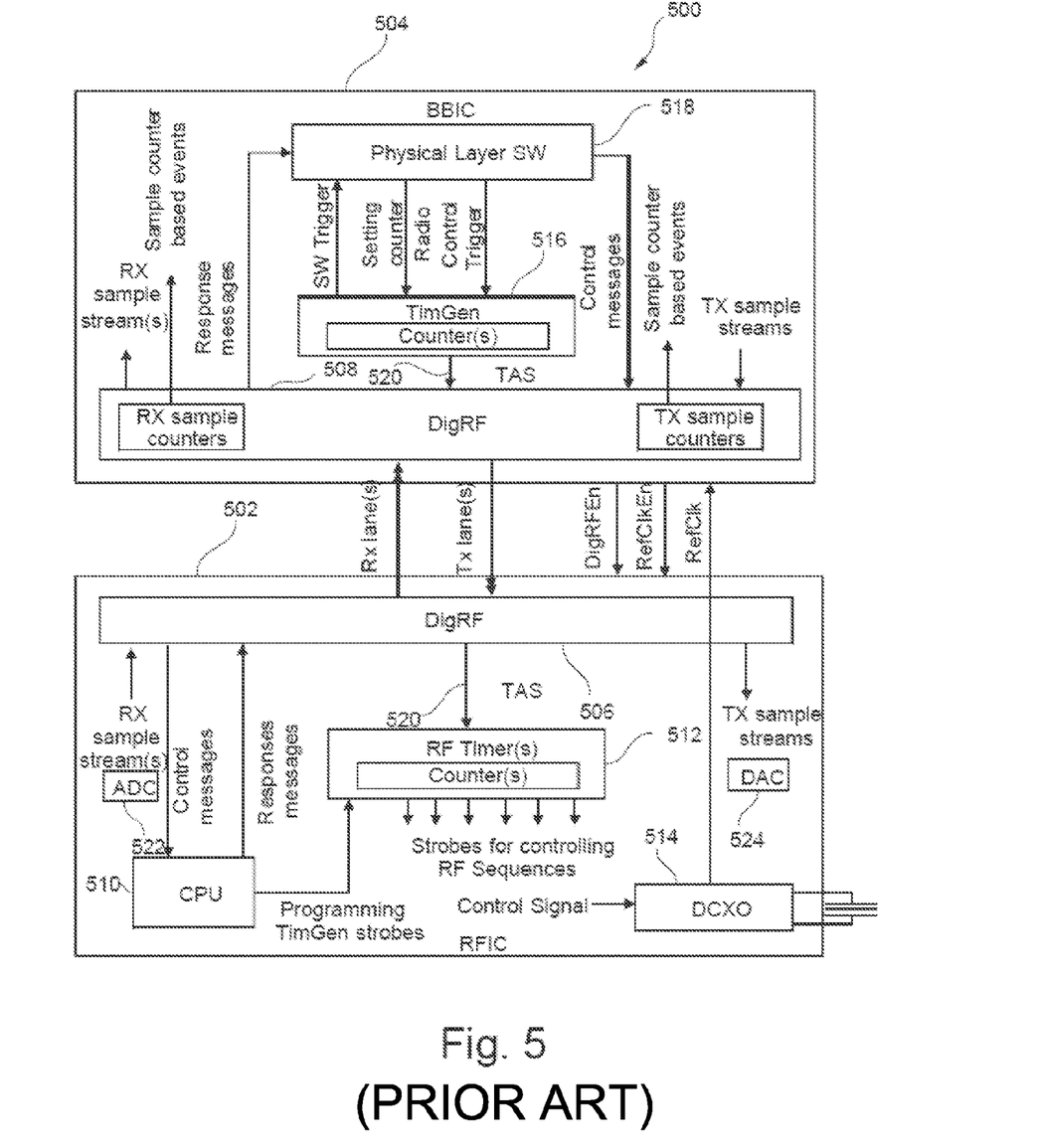
FIG. 5 illustrates a conventional communication device.

FIG. 5 shows a conventional communication device 500 which comprises a radio frequency integrated circuit (RFIC) 502 and a base band integrated circuit (BBIC) 504. A digital radio frequency interface 506, 508 couples the RFIC 502 with the BBIC 504. A central processing unit (CPU) 510 is provided in the RFIC 502 which exchanges messages with the digital radio frequency interface 506. Furthermore, the CPU 510 may communicate with a timing generation unit 512 of the RFIC 502 for generating timing information or timing signals for time control of the RFIC 502. A clock generation unit 514, denoted as DCXO, generates a clock signal which can be transmitted to the BBIC 504.

The BBIC 504 also has a timing generation unit 516 which is communicatively coupled with the digital radio frequency interface 508 as well as with a physical layer (implemented in software) 518.

As can be taken from FIG. 5, each of the RFIC 502 and the BBIC 504 generates separately timing information in the corresponding timing generation unit 512, 516. In order to synchronize the RFIC 502 with the BBIC 504, Time Accurate Strobe (TAS) messages 520 with a high requirement regarding timing accuracy have to be exchanged within the communication device 500.

FIG. 5 also shows an analog-to-digital converter 522 for converting of incoming analog signals into digital signals. Furthermore, a digital-to-analog converter 524 is capable of converting digital signals for transmission into analog signals.

Figure 6:
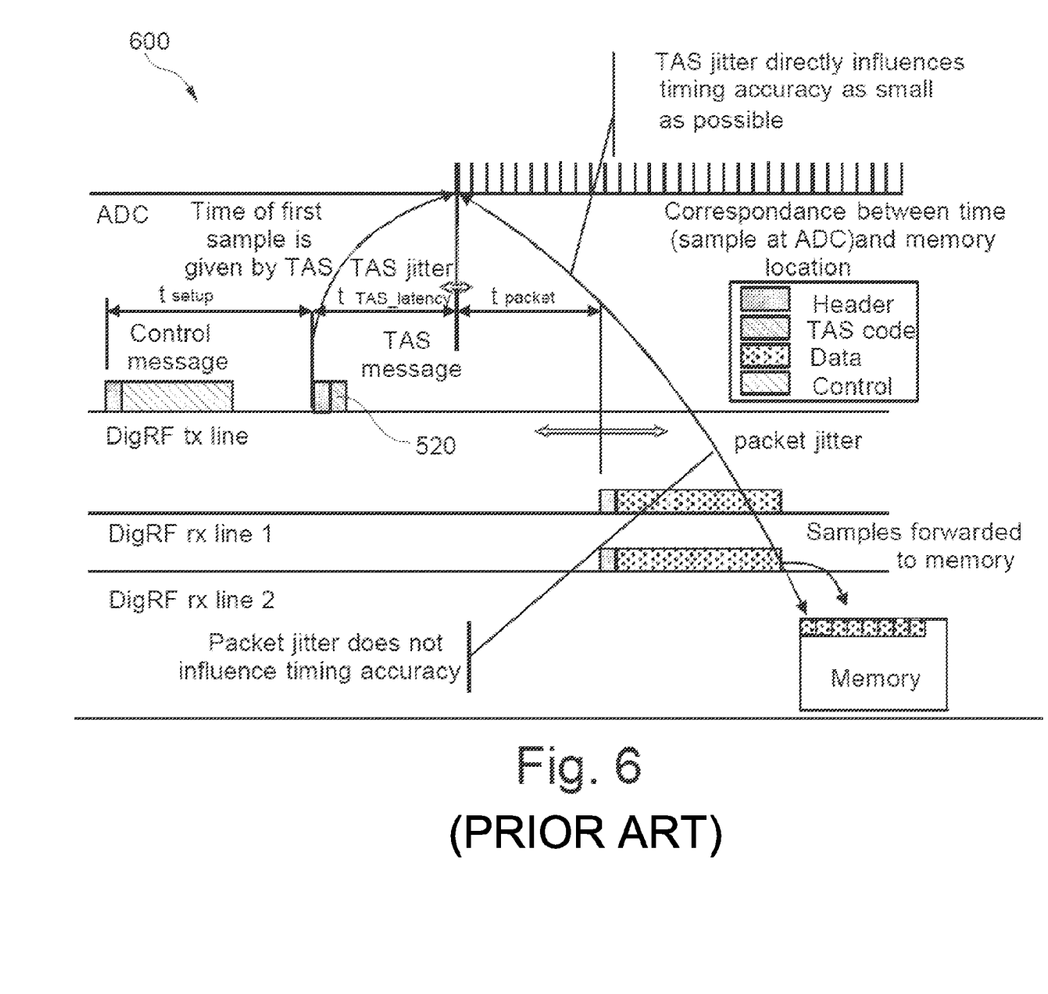
FIG. 6 illustrates a conventional message transmission scheme between different components of the communication device of FIG. 5.

FIG. 6 shows a timing diagram 600 relating to FIG. 5 and illustrating schematically various messages to be transmitted over the various transmission lines shown in FIG. 5 and FIG. 6.

In the shown conventional approach, particularly the necessity of sending TAS messages 520 is problematic since these TAS messages 520 have to be very accurate in time and require significant effort.

According to the architecture of FIG. 5 and FIG. 6, real time tracking is split between BBIC 504 and RFIC 502. The timing generation unit 516 in the BBIC 504 is a hardware unit including at least a timer which reflects the timing of a serving cell. The RFIC 502 also has the timing generation unit 512 as a timer, whereas the DigRF standard defined TAS messages 520 are used for synchronizing the timing generation unit 512 (RFIC timer) to the timing generation unit 516 (BBIC timer).

The reference clock is generated in the RFIC 502. This is also reflected in the DigRF standards by specifying a RefClk signal as part of the standard. RFIC 502 normally offers several reference clock ports which can be used for different clients like BBIC 504, WLAN, Bluetooth, GPS or A-GPS.

There are in general two possibilities for delivering the reference clock to the rest of the platform:

Corrected reference clock: This means the clock is synchronized to the serving cell using automatic frequency correction. For other applications this may be a disadvantage.

Uncorrected clock: A free-running reference clock is delivered to BBIC 504. There is no control loop for the clock needed what eases design. The disadvantage is that the timing generation in BBIC 504 needs a correction mechanism to synchronize its real-time unit to the serving cell.

In general, two different time domains can be distinguished:

The Real-Time is the time when a certain signal or part of a signal is received or transmitted as analog physical signal on a reference point, for instance antenna or ADC input respectively DAC output.

The Sample Time is the time instance at which a sample arrives at BBIC 504 or RFIC 502. This time has in average a constant relation to the real time but may strongly jitter with short-term perspective.

Another important aspect is the memory location of samples in BBIC 504, because this gives a direct connection to the real-time. The BBIC 504 needs a reference point, which means that the BBIC 504 needs to know the real time instance of one sample stored at a specific memory location (see FIG. 6). With this knowledge all other real-time instances for all other samples can be calculated making use of the fact that the samples are equidistantly sampled.

In the following, real-time control in the conventional system will be explained.

In conventional platforms using DigRF v3 or DigRF v4 the functional split between BBIC 504 and RFIC 502 is not very clean regarding real-time controlling. The real-time control is spread over BBIC 504 and RFIC 502, whereas the master is the BBIC 504.

This real-time information is mainly used for radio control issues and for sending periodical events to the software, which is planning then the next processing steps. It is also used for controlling sleep modes and wake up.

The radio controlling itself shall be done highly accurate because this directly affects system performance with respect of throughput.

The software events are anyway caught by a processor which cannot react very accurately due to context switch, etc.

The RFIC 502 includes either no internal timer (not shown in FIG. 5) which means that all detailed control must be handled by the BBIC 504, or the RFIC 502 includes an additional timing generation unit 512 (scenario of FIG. 5) which cares about detailed sequences done within the RFIC 502. In the latter case there is a rough real time control which is done by BBIC 504 and a fine real-time control which is done by RFIC 502 autonomously. Both approaches require time accurate signaling between RFIC 502 and BBIC 504.

The DigRF interfaces 506, 508 could contain sample based counters which count incoming or outgoing samples. Based on this counters, events may be triggered towards software or hardware components for data flow control or raising control events. These events have a loose coupling to the counter of the timing generation unit 516, because in average the number of samples delivered over the DigRF interfaces 506, 508 is proportional to the counter of the timing generation unit 516, but due to the packet based delivery over the DigRF interfaces 506, 508 and the multiplexing with other messages there is a certain jitter within the sample counters.

To synchronize the BBIC 504 real time control block to the RFIC 502 real time control parts highly accurate strobe messages are needed. In conventional analog interfaces these are dedicated lines, in DigRF based systems these are the TAS messages 520. In the latter one the accuracy is limited to around 30 ns, and the TAS messages 520 cause additional design effort.

Concluding, the described existing solutions suffer from shortcomings.

The BBIC 504 has the timing generation unit 516 as master timer unit, which maintains a timing of a serving cell and neighbored cells in connected mode and a special timer for sleep mode handling. To follow a timing of a serving cell, timing has to be synchronized to evolved NodeB (eNodeB) using automatic frequency control (AFC). This requires AFC to correct a reference clock or to control a mechanism which controls the real-time block in BBIC 504.

SUMMARY

It is an object of the invention to provide a communication device comprising two or more communication entities connected via a digital interface which allows to ease implementation and save area.

In order to achieve the object defined above, a communication device, a method of processing data samples, a program element, and a computer-readable medium according to the independent claims are provided.

According to an exemplary embodiment of the invention, a communication device for processing data samples is provided which comprises a communication entity and a further communication entity communicatively coupled to the communication entity in accordance with a digital (for instance a Digital Radio Frequency) protocol (or with a digital interface). The communication entity comprises a timing generation unit (or time generator unit) adapted for generating real-time related timing information for operating hardware components of the communication entity when processing data samples. The further communication entity is adapted for operating hardware components of the further communication entity in a sample-driven way when processing data samples.

According to another exemplary embodiment of the invention, a method of processing data samples by a communication entity and a further communication entity communicatively coupled to the communication entity in accordance with a digital protocol is provided. The method comprises generating real-time related timing information by the communication entity, and operating hardware components of the communication entity based on the generated real-time related timing information when processing data samples. The method further comprises operating hardware components of the further communication entity in a sample-driven way when processing data samples.

According to still another exemplary embodiment of the invention, a program element (for instance a software routine, in source code or in executable code) is provided, which, when being executed by a processor (such as a microprocessor), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "communication device" may particularly denote a transmitter device, a receiver device or a transmitter/receiver device (transceiver) which allows for a unidirectional or bidirectional exchange of communication messages with a communication partner. Such a communication device may particularly be a wireless communication device, i.e. a communication device which communicates without the necessity of wires. However, wire-based communication is also possible in other embodiments. An example of a communication device is a mobile phone.

The term "communication entity" may particularly denote a hardware, software or hybrid entity controlling or contributing a part of the operation of the communication device. In an embodiment, such a communication entity may be an integrated circuit such as a base band integrated circuit (BBIC) or a radio frequency integrated circuit (RFIC). Such a communication entity may be configured as an electronic chip (such as an ASIC) or as a conventionally wired circuit.

The term "data samples" may particularly denote data blocks, data sets or data sections of a data stream to be processed. More particularly, such data may relate to telecommunication data to be received or transmitted.

The term "digital protocol" may particularly denote a digital serial interface, particularly according to the DigRF (Digital Radio Frequency) standard. The DigRF standard is available in version DigRF v3 and in version DigRF v4. The physical layer of DigRF standard may connect a radio frequency integrated circuit (RFIC) and a base band integrated circuit (BBIC) via an interface. Alternatively, the digital protocol may also be a proprietary digital protocol. Hence the communication entity and/or the further communication entity may have a digital part.

The term "hardware components" of the respective communication entity may particularly denote units which are physical members of the respective communication entity. The latter may be an integrated circuit or a part thereof so that the hardware components may be integrated circuit components or groups of integrated circuit components.

The term "software components" of the respective communication entity may particularly denote virtual components which provide a processing capability in the respective communication entity.

The term "real-time related timing information" may particularly denote timing information related to a real-time process, more particularly to a reference point defined as a point of time at which a signal (particularly a data sample) is present as an analogue physical signal at a coupled hardware component such as an antenna or at the input of an analog-to-digital converter (ADC) respectively at the output of an digital-to-analog converter, for instance is received or is ready for transmission at such a hardware component.

The term "operating in a sample-driven way" may particularly denote an operation triggered by a point of time at which a sample is received at a respective one of the communication entities for processing. Thus, a sample-driven timing may not rely on an absolute clock value but may be based on a manner according to which a sequence of data samples is to be processed.

An embodiment of the invention allows for a clean separation of sample based processing and real-time based processing between two communicatively coupled communication entities. In an embodiment of the communication system, it is the communication entity only which comprises a timing generation unit adapted for generating real-time related timing information and which is adapted for being operable in a real-time domain when processing the data samples (particularly having a real-time based processor). In contrast to this, the further communication entity of the communication system may be adapted for operating in a sample-based domain when processing the data samples (particularly having a sample-based processor). In view of this processing scheme of the further communication entity, the provision of a separate timing generation unit in the further communication entity may be dispensable which results in an efficient time management which is implementable with reasonable effort.

A gist of an embodiment of the invention is to move all real-time control and therewith the timing generator unit to the communication entity alone. This allows for a clean split between the communication entity and the further communication entity regarding timing control. The communication entity may handle all real-time critical parts of the access part, whereas the further communication entity has a sample-based processor which does not need to have accurate real-time knowledge by means of an accurate hardware timer.

Such an architecture has the advantage of a clean split regarding timing control between the communication entity and the further communication entity. The communication entity works in the real-time domain and the further communication entity in the sample-based domain. An uncorrected reference clock may be delivered to the platform, whereas no additional compensation is required in the further communication entity, and there is no additional need for one or more phase-locked loops (PLL) to correct a clock. No time accurate signaling between the communication entity and the further communication entity is necessary. An easy automatic frequency control (AFC) algorithm may be used. Furthermore, it is easy from the point of view of the communication entity (for instance an RFIC) to support both mechanisms, the above described conventional approach and the approach according to an embodiment of the invention, because both will basically differ by a corresponding software configuration.

In the following, further exemplary embodiments of the communication device will be explained. However, these embodiments also apply to the method, to the program element and to the computer-readable medium.

The further communication entity may be the system's master and may maintain real-time information by means of a software timer which counts on a quite high granularity. In average, the software timer may be synchronous to the high precision timing generator unit of the communication entity.

In an embodiment, the further communication entity includes no real-time based counter. Consequently, no real-time critical messages have to be forwarded to the communication entity neither for synchronizing the counters between the communication entity and the further communication entity nor for other real-time control. The communication entity includes now the only platform timer, which reflects the real-time, but the further communication entity is still the complete master over the communication entity and also real-time control.

In an embodiment, timing control in the further communication entity is performed based on the timing information received directly or indirectly from the communication entity only. Therefore, in such an embodiment, the further communication entity does not include any active component which generates a timing information on its own. In contrast to this, a receiving interface of the communication entity may be capable of being provided with timing information received from the communication entity and used by the further communication entity as a basis for controlling its own hardware components.

In an embodiment, the further communication entity may be adapted for operating all hardware components of the further communication entity in a purely sample-driven way when processing data samples. This may be done without generating real-time related timing information by the further communication entity itself. In such an embodiment, no active mechanism has to be provided in the further communication entity for generating a real-time information which would have to be synchronized with the communication entity. In contrast to such a synchronization, the further communication entity in the described embodiment relies exclusively on the real-time related timing information generated by the communication entity and triggers operation of its own hardware components in a purely data sample-driven way.

In an embodiment, the communication entity may be adapted for performing the entire real-time control of the communication entity and of the further communication entity. Thus, in terms of timing, the communication entity can be considered as kind of a master, since the further communication entity in this respect acts as a slave which only receives the timing information from the communication entity without contributing any active timing control performance. However, apart from the timing control, it is possible that the further communication entity serves as a master regarding operation of the communication device and drives the communication entity. Such a split of the master and slave functions of the two communication entities with regard to timing on the one hand and all remaining tasks on the other hand is a paradigm shift as compared to conventional architectures in which usually the further communication entity operates fully as the master and the communication entity operates fully as a slave.

According to an exemplary embodiment, the communication entity and the further communication entity together comprise exactly the one timing generation unit of the communication entity. Therefore, in such an embodiment, no additional time generation unit is provided in the communication device based on which the timing of hardware components could be controlled. Therefore, the entire communication device comprises altogether exactly one time generation unit, i.e. the timing generation unit arranged in the communication entity. This allows for a very simple implementation of the communication device and also of the further communication entity.

In an embodiment, the communication entity is adapted for internally transmitting real-time related communication messages including a time stamp indicative of a time at which a corresponding operation is to be executed. The time stamp may be generated under consideration of the previously generated real-time related timing information. Thus, the real-time related timing information generated by the communication entity may be included in the messages which are transmitted between internal components of the communication entity. Particularly communication messages exchanged between a digital radio frequency interface of the communication entity and a processing unit of the communication entity may include such a time stamp. The time stamp may form part of the payload or a header of such communication messages. For instance, both control messages received from the processing unit and transmitted by the digital radio frequency interface as well as response messages sent from the processing unit to the digital radio frequency interface may have such a time stamp.

Additionally or alternatively, the further communication entity may be adapted for internally transmitting real-time related communication messages including a time stamp indicative of a time at which a corresponding operation is to be executed. This time stamp may be generated under consideration of the real-time related timing information generated by the communication entity. Thus, the real-time related timing information generated by the communication entity may be included in the messages which are transmitted between internal components of the further communication entity. Particularly communication messages exchanged between a digital radio frequency interface of the further communication entity and a physical layer software of the further communication entity may include such a time stamp. The time stamp may be arranged as a part of the payload or a header of such communication messages. For instance, both control messages received from the digital radio frequency interface and transmitted by the physical layer software as well as response messages sent from the digital radio frequency interface to the physical layer software may have such a time stamp.

According to an exemplary embodiment, the communication device may be adapted for providing the further communication entity with timing signals for triggering operation of software components of the further communication entity. Such a trigger may be used, for instance, for starting processing data samples. In many cases, the time accuracy requirements of software components are less demanding as compared to hardware components. For example, hardware components should be controlled with an accuracy in the order of magnitude of nanoseconds, whereas software components may be operated with an accuracy in the domain of milliseconds to microseconds.

In one embodiment of triggering operation of software components, the communication entity may be adapted for generating the timing signals based on the generated real-time related timing information. Corresponding timing signals may be transmitted from the communication entity to the further communication entity via Digital Radio Frequency interfaces. In such an embodiment, it is possible that software components of the further communication entity are triggered based on messages exchanged via the digital radio frequency interface and the physical layer of the further communication entity.

Additionally or alternatively, for triggering operation of software components, the communication device (more particularly the further communication entity) may be adapted for generating a timing signal each time a counted number of processed data samples has reached a predefined value. In other words, it is possible to simply count the number of processed data samples which, in the average, may have a well-defined relation to the timing information generated by the timing generation unit of the communication entity. Hence, simply counting the number of samples allows to derive timing information as kind of a software clock. A trigger may be activated when a certain number of samples has been counted. For instance in Long Term Evolution (LTE), each time 3072 samples are counted, a trigger may be initiated.

The communication entity may be adapted for providing the generated real-time related timing information to the further communication entity for controlling a timing of the processing of the data samples by the further communication entity. Thus, both communication entities may rely, directly or indirectly, on the generated timing information. The communication entity may use this information directly. The further communication entity may be operated using a sample-based architecture which however indirectly considers and relies on the timing information generated by the communication entity.

In an embodiment, the communication entity may comprise a radio frequency integrated circuit (RFIC). The further communication entity may comprise a base band integrated circuit (BBIC). RFIC and/or BBIC may be arranged on separate electronic chips or on a common electronic chip, may be arranged in separate packages or in a common package, etc. RFIC and/or BBIC may be realized as an ASIC.

In addition to the above-described hardware-control, the timing generation unit may also be adapted for generating real-time related timing information for operating software components of the communication entity when processing data samples. Thus, both hardware and software components may be controlled by the generated timing information. It is also possible that the further communication entity is adapted for operating software components of the further communication entity in a sample-driven way when processing data samples.

The communication entity and the further communication entity may be adapted for exchanging a sequence of messages to establish a relation between a real-time assigned to the real-time related timing information and a sample-time assigned to the sample-driven processing. This enables the further communication entity to perform a sample-driven operation of its components without having a separate time generation unit.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

The illustration in the drawing is schematically. In different drawings, similar or identical elements are provided with the same reference signs.

An exemplary aspect of the invention is to move all real-time control and therewith the timing generator to an RFIC. This allows for a clean split between the RFIC and a communicatively coupled BBIC regarding timing. The RFIC handles all real-time critical tasks of the access part, whereas the BBIC operates with a sample-based processor which does not need to have accurate real-time knowledge by means of an accurate hardware timer. The BBIC is the system's master and maintains real-time information by means of a software timer which counts on a quite high granularity in the order of magnitude of, for instance, milliseconds. In average, the software timer may be synchronous to the high precision timing generator unit in the RFIC.

Figure 1:
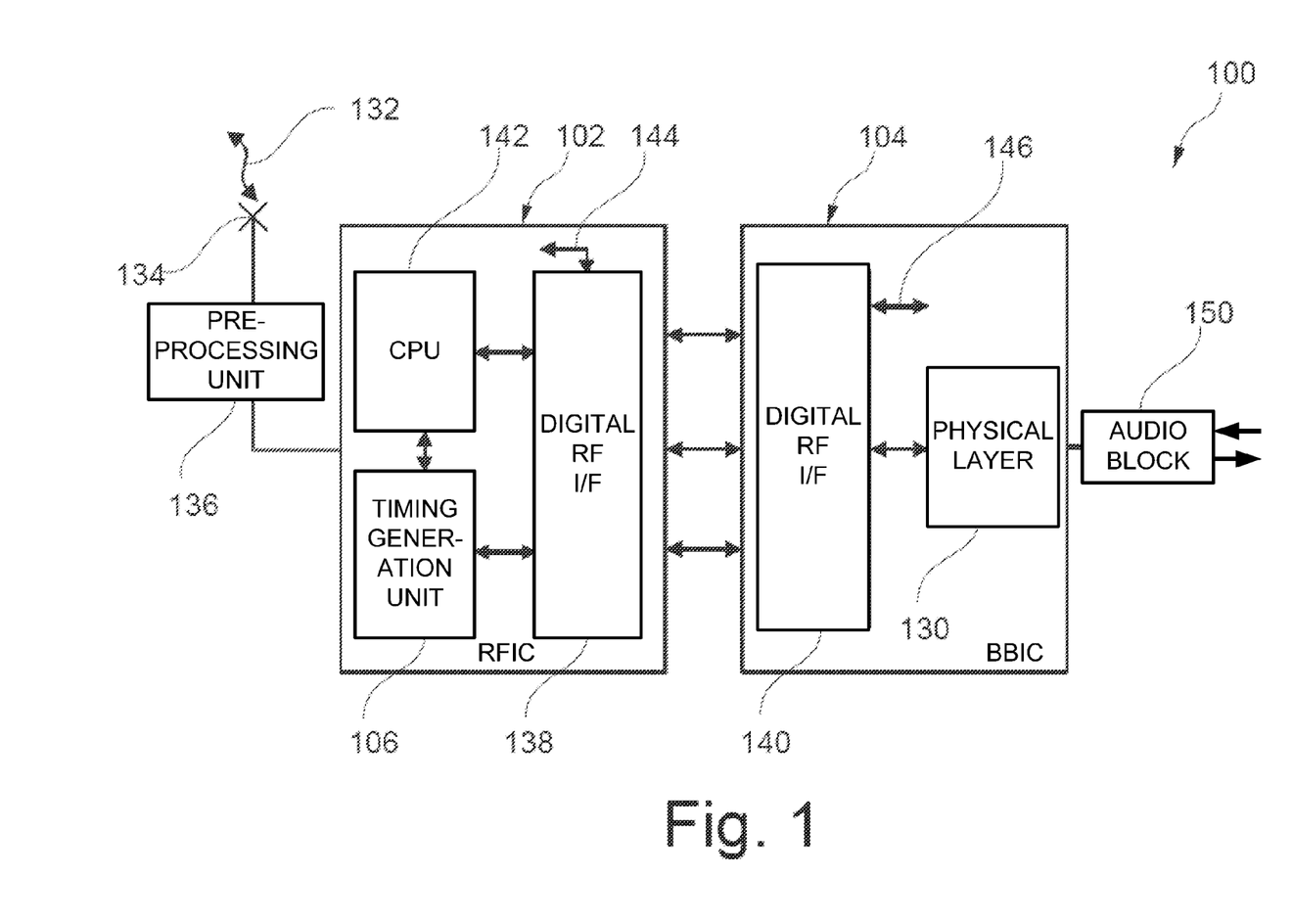
FIG. 1 illustrates a communication device according to an exemplary embodiment of the invention.

FIG. 1 schematically illustrates a mobile phone 100 as an example for a communication device according to an exemplary embodiment of the invention.

The mobile phone 100 (not all components are shown in FIG. 1) comprises a radio frequency integrated circuit (RFIC) 102 and a base band integrated circuit (BBIC) 104. The BBIC 104 implements several communication layers, whereas the lowest layer, so-called physical layer 130 is responsible for real-time control and radio control. The RFIC 102 has no layer structure with respect to communication layers.

During operation of the mobile phone 100, a wireless transmission of electromagnetic radiation 132 takes place between a communication partner device (such as another mobile phone or a base station, not shown) and a transceiver antenna 134 of the mobile phone 100. When the transceiver antenna 134 has received the electromagnetic radiation signal 132, the latter may be forwarded to a pre-processing unit 136 and subsequently to the RFIC 102 for analog-to-digital conversion and for base band transformation. The processed signal may then be supplied to the BBIC 104 for further signal processing. For a communication between the RFIC 102 and the BBIC 104, each of them comprises a respective digital radio frequency interface 138, 140.

A timing generation unit 106 of the RFIC 102 is adapted for generating real-time related timing information which can be communicated to the digital radio frequency interface 138. Furthermore, a processing unit 142 (for instance a central processing unit, CPU) of the RFIC 102 is capable of communicating with the digital radio frequency interface 138 as well, wherein time stamp data blocks may be added to such messages which are indicative of a time at which a certain task is to be carried out. Further, the digital radio frequency interface 138 of the RFIC 102 can receive sample streams and can send sample streams via a data sample interface 144. Via this data sample interface 144, the digital radio frequency interface 138 may also communicate with further hardware components of the RFIC 102, such as an ADC, a DAC, etc.

Also in the BBIC 104, sample streams may be processed. Again, an interface 146 is provided via which a sample stream may be sent to/received from the digital radio frequency interface 140. Furthermore, a physical layer 130 (implemented in software) may be controlled by a software trigger signal received via the digital radio frequency interface 140.

As indicated schematically in FIG. 1, a processed signal may be reproduced using a loudspeaker or the like included in an audio block 150 of the mobile phone 100.

Such audio data may then be processed and transmitted via the transceiver antenna 134 as electromagnetic radiation 132 towards a communication partner device (not shown).

Thus, the mobile phone 100 forms a communication device for processing data samples. Only the RFIC 102, not the BBIC 104, comprises a timing generation unit 106 for generating real-time related timing information for operating hardware components of the RFIC 102 when processing the data samples. In contrast to this, the BBIC 104 is adapted for operating its hardware components in a purely sample-driven way when processing the data samples. In other words, the BBIC 104 is free of a time generation unit. The RFIC 102 performs the entire real-time control in the mobile phone 100. When transmitting real-time related communication messages within the RFIC 102, a time stamp can be added to the respective messages. Also internal transmission of real-time related communication messages in the BBIC 104 may include the addition of such a time stamp. Triggering software components, compare physical layer 130, in the BBIC 104 may be performed based on the timing information generated in the timing generation unit 106 of the RFIC 102. Alternatively, it is also possible to count the number of samples processed by the mobile phone 100 shown in FIG. 1, and to trigger a software process each time a predefined number of samples has been received.

Figure 2:
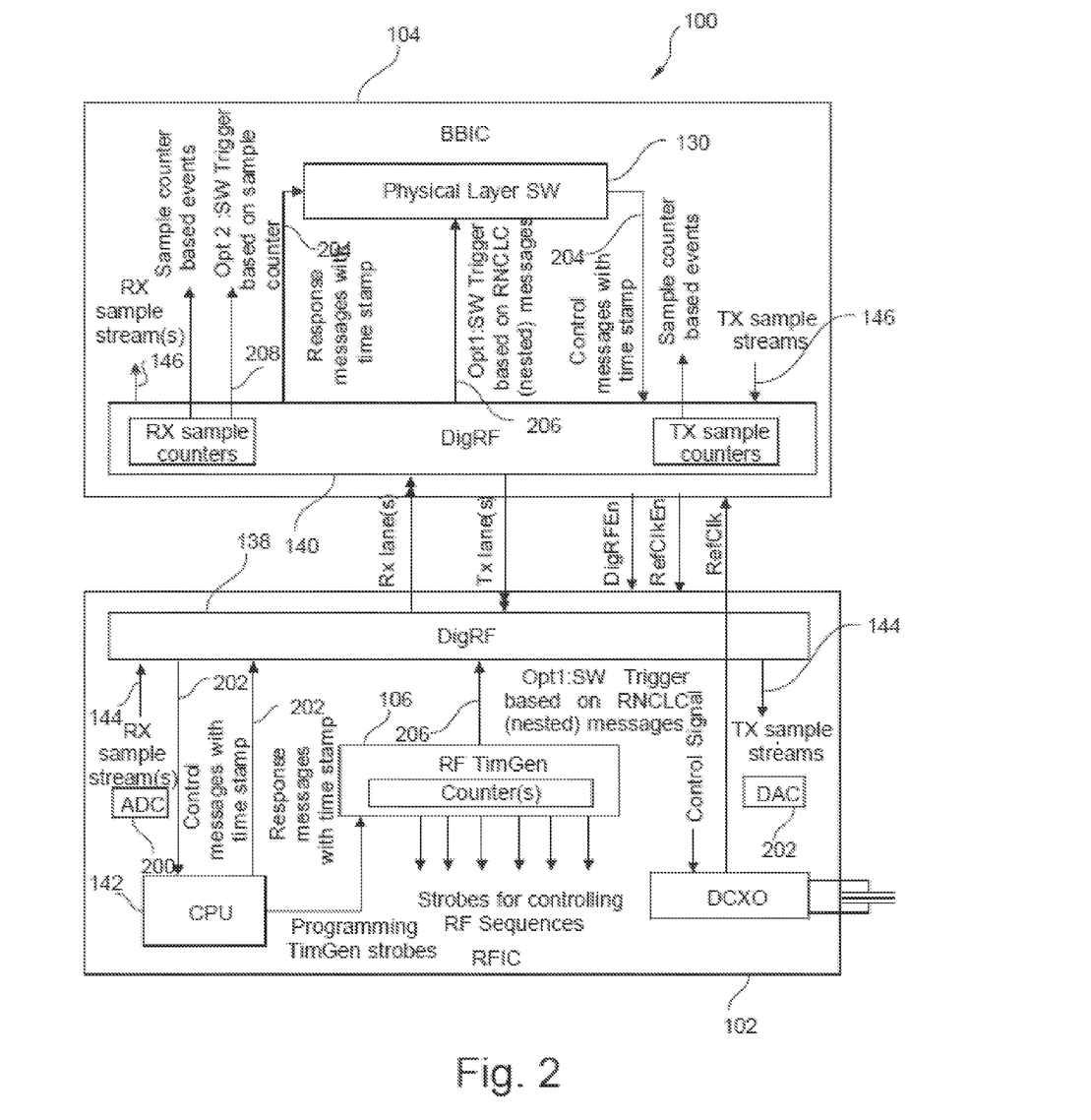
FIG. 2 illustrates a communication device according to another exemplary embodiment of the invention.

FIG. 2 shows a more precise and more detailed illustration of the communication architecture in the communication device 100 between the RFIC 102 and the BBIC 104.

As can be taken from FIG. 2, a data stream may be received via the interface 144 in the RFIC 102. For instance, such a sample stream may be received in a digital format provided at an output of an analog-to-digital converter (ADC) 200. In a similar manner, a sample stream to be transmitted can be sent via the interface 144 to a digital-to-analog-converter (DAC) 202.

The timing generation unit 106 generates timing signals which can be used for control purposes within the RFIC 102. The central processing unit (CPU) 142 programs timing generation strobes. Strobes for controlling radio frequency sequences are generated by the timing generation unit 106.

Furthermore, when communicating messages 202 between the central processing unit 142 and the digital radio frequency interface 138 of the RFIC 102, a time stamp will be added to these messages 202 in accordance with timing information generated by the time generation unit 106.

In a similar manner, a communication between the physical layer 130 and the digital radio frequency interface 140 of the BBIC 104 may also include a time stamp. Corresponding messages including such a time stamp are denoted with reference numeral 204.

However, the entire timing within the RFIC 102 is based on the timing information generated by the time generation unit 106, whereas the operation of the hardware components in the BBIC 104 is purely sample-driven.

As can be taken from FIG. 2, there is—in contrast to the conventional architecture of FIG. 5—no necessity to exchange TAS messages, since no synchronization between real-time counters in the RFIC 102 and the BBIC 104 is necessary.

For triggering processes in the physical layer (software) 130 of the BBIC 104, the timing signals generated by the timing generation unit 106 may be used (this is indicated as option 1 and illustrated by reference numeral 206). Alternatively, in an option 2 (illustrated by reference numeral 208) it is possible to simply count the number of samples processed in the communication device 100 and to trigger a software process each time a predefined number of sample processes has been exceeded.

The BBIC 104 includes no real-time based counter and therefore no real-time critical messages must be forwarded to the RFIC 102 neither for synchronizing the counters between RFIC 102 and BBIC 104 nor for other real-time control.

The RFIC 102 includes now the only platform timer, which reflects the real-time but the BBIC 104 is still the complete master over the RFIC 102.

With regard to a reference clock, there is no more any need for delivering a corrected clock from the RFIC 102 to the BBIC 104, because the BBIC 104 processing is now purely sample driven. The only reason for delivering a corrected reference clock would be a timing generation unit in the BBIC 104 which is now obsolete. This eases platform design with respect to clock distribution. AFC will now only influence processing and clock generation within RFIC 104.

The relation to real time is as follows. Each real-time related control message 202, 204 (for instance a 'Switch Rx On' message) will include a time stamp, that refers to the timing generator (TimGen) counter value in RFIC 102. This means the message 202, 204 is executed in a way that the first sample delivered to BBIC 104 corresponds to the real-time instance specified in the message 202, 204, whereas the real-time is reflected by a counter included in the TimGen of the RFIC 102. Compared to FIG. 5, the TAS is not needed because the TimGen in the RFIC 102 is now controlled indirectly by the time stamp included in the 'Switch RX On' message.

Figure 3:
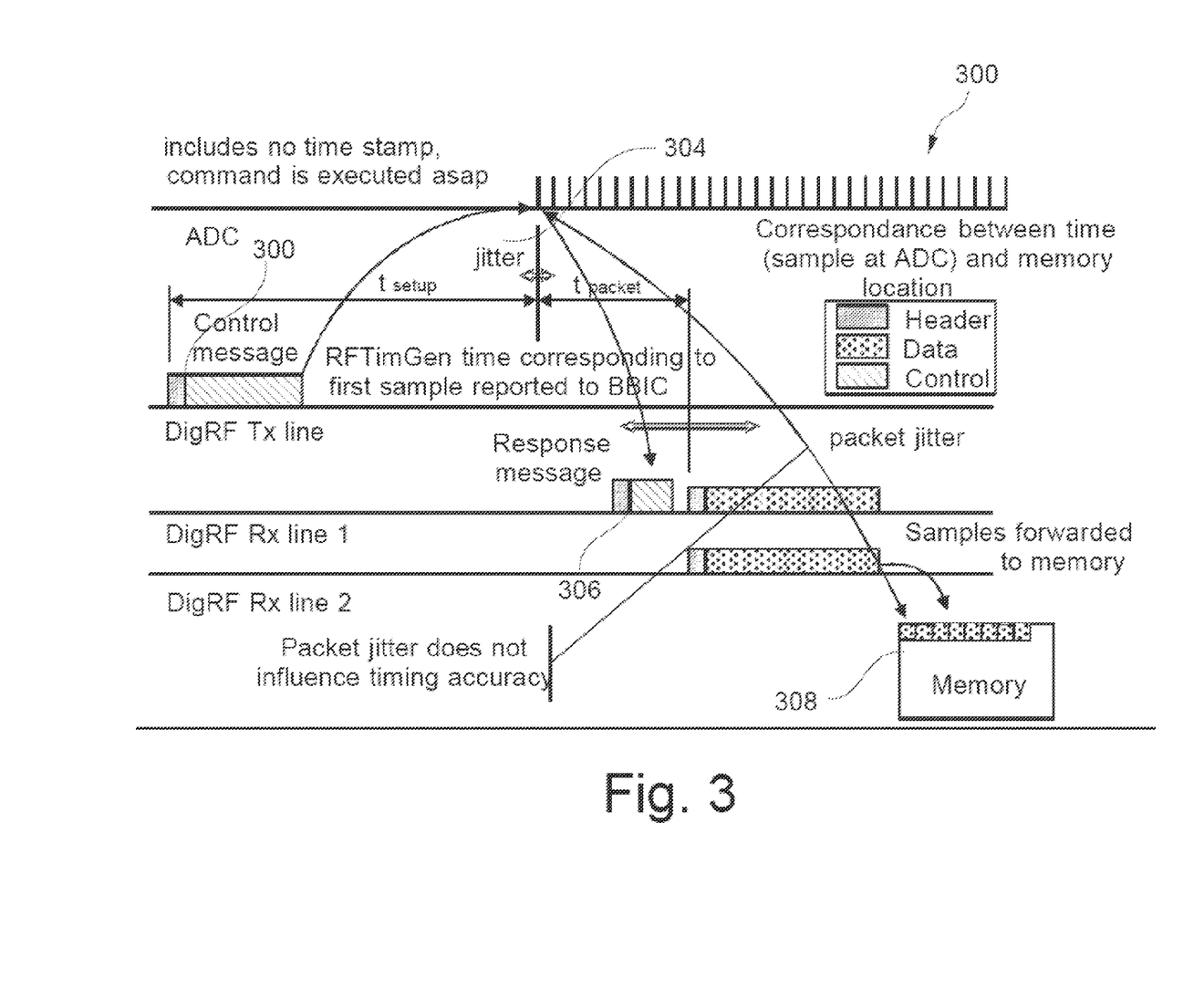
FIG. 3 illustrates a message transmission scheme between different components of the communication device of FIG. 2 according to an exemplary embodiment of the invention.

For initial cell search, the time stamp could be set to immediately, what means that the Rx switch on procedure would be executed as soon as possible. The RFIC 102 should in this case report the time stamp, which reflects the real-time, back to the BBIC 104. The time stamp refers then again to the first sample delivered to the BBIC 104. The BBIC 104 should take care that this sample is forwarded to a known memory location to get the wanted real-time relation between memory location and real-time. This is illustrated in FIG. 3 showing establishing a relation between real-time and sample stored at a specific memory location.

All real-time related messages 202, 204 may contain a time stamp, which specifies when they shall be executed. The messages 202, 204 should be sent well in advance to allow processing. Therefore the software needs trigger events at known time instances. These events do not need to have a high accuracy, it is sufficient that they are roughly accurate.

There are particularly two possibilities to trigger these events:

Option 1: Based on RNCLC messages delivered by TimGen of the RFIC 102. The TimGen of the RFIC 102 can be used to emit nested RNCLC messages to the BBIC 104 at given time instances. The payload can be used for distinguishing several events. This is similar to TAS messages but in opposite direction and with less impact regarding time accuracy.

Option 2: Based on Rx sample counters. These counters will be in average proportional to the TimGen of the RFIC 102, but will be stressed with a jitter.

FIG. 3 shows corresponding sequences of messages 300 transmitted between the various lines of FIG. 2, which are used to establish the desired relation between real-time and sample-time (means memory location). A control message 300 tells the RFIC 102 to start sampling in the Rx path as soon as possible. After a certain setup time tsetup the ADC is started and a certain time later a first data packet is delivered to BBIC 104. This delivery time can have a jitter 304 dependent on the load of the interface 138, 140, but this is not of relevance as soon as a worst case delivery time is hold. The RFIC 102 will now send a response message 306 back to the BBIC 104 including the real-time instance where the first sample in the first packet belongs to. Herewith the BBIC 104 has knowledge of the relation between sample position in memory 308 and real-time and can trigger further action with respect to this knowledge.

Figure 4:
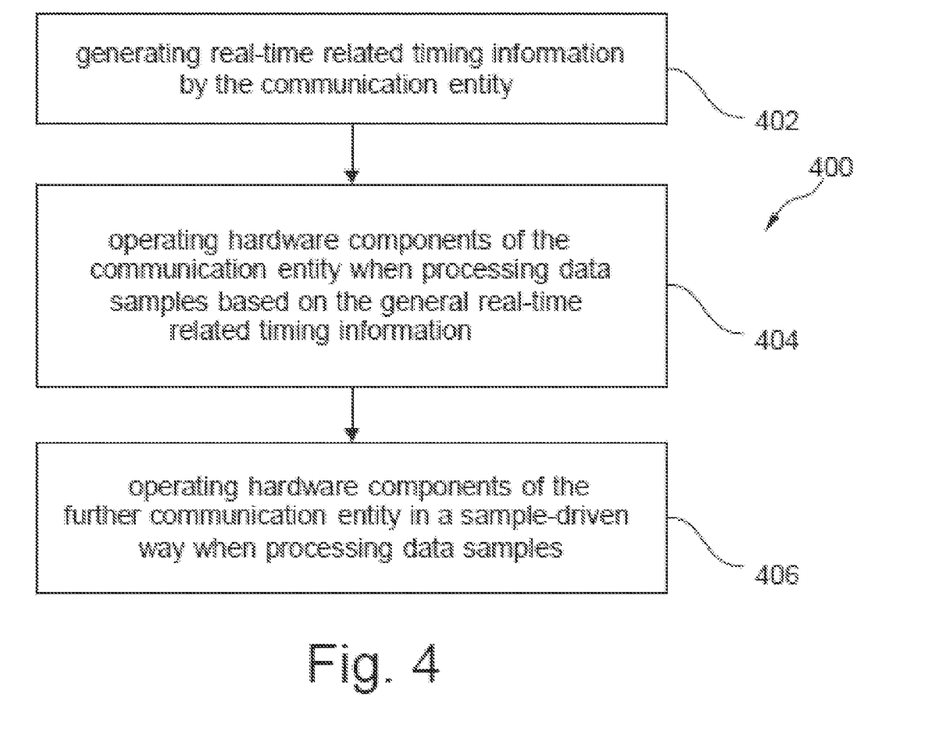
FIG. 4 illustrates a communication method according to an exemplary embodiment of the invention.

FIG. 4 shows a flow-chart 400 illustrating a method of processing data samples by a communication entity and a further communication entity communicatively coupled to one another in accordance with a DigRF protocol. The method of FIG. 4 corresponds to an architecture shown, for instance, in FIG. 2 and FIG. 3.

In a block 402, real-time related timing information is generated by the communication entity. In a subsequent block 404, hardware components of the communication entity are operated when processing data samples based on the generated real-time related timing information. In a subsequent block 406, hardware components of the further communication entity are operated in a purely sample driven way when processing data samples, i.e. without timing information generated directly within the further communication entity.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A communication device for processing data samples, the communication device comprising:
   a first communication entity;
   a second communication entity communicatively coupled to the first communication entity in accordance with a digital protocol;
   wherein the first communication entity comprises a timing generation unit configured to generate real-time related timing information for operating hardware components of the first communication entity and of the second communication entity when processing data samples;
   wherein the second communication entity is configured to internally transmit real-time related communication messages including a time stamp indicative of a time at which a corresponding operation is to be executed, the time stamp generated based on the real-time related timing information generated by the first communication entity; and wherein the second communication entity is configured to:
trigger operation of hardware components of the second communication entity at a point of time at which a sample is received; and
execute operation of the hardware components of the second communication entity at the time indicated in a corresponding time stamp.

2. The communication device of claim 1 wherein the first communication entity is configured to internally transmit real-time related communication messages including a time stamp indicative of a time at which a corresponding operation is to be executed.

3. The communication device of claim 1 wherein the second communication entity is free of a separate timing generation unit for generating real-time related timing information.

4. The communication device of claim 1 wherein the communication device is configured to provide the second communication entity with timing signals for triggering operation of software components of the second communication entity.

5. The communication device of claim 4:
wherein the first communication entity is configured to transmit the generated real-time related timing information to the second communication entity via the digital protocol; and
wherein the communication device is configured to generate the timing signals based on the generated real-time related timing information transmitted from the first communication entity to the second communication entity.

6. The communication device of claim 4 wherein the communication device is configured to generate a timing signal each time a counted number of processed data samples has reached a predefined value.

7. The communication device of claim 1 wherein the first communication entity is configured to provide the generated real-time related timing information to the second communication entity for controlling a timing of the processing of the data samples by the second communication entity.

8. The communication device of claim 1 wherein the second communication entity is configured to operate as a master and the first communication entity is adapted to operate as a slave with regard to the processing of the data samples in the communication device.

9. The communication device of claim 1 wherein the first communication entity comprises a radio frequency integrated circuit.

10. The communication device of claim 1 wherein the second communication entity comprises a base band integrated circuit.

11. The communication device of claim 1 wherein the second communication entity is communicatively coupled to the first communication entity in accordance with a Digital Radio Frequency protocol.

12. The communication device of claim 1 wherein the timing generation unit is configured to generate real-time related timing information for operating software components of the first communication entity when processing data samples.

13. The communication device of claim 1 wherein the first and second communication entities are configured to exchange a sequence of messages to establish a relation between a real-time assigned to the real-time related timing information and a sample-time assigned to sample-driven processing.

14. A method of processing data samples by a first communication entity and a second communication entity communicatively coupled to the first communication entity in accordance with a digital protocol, the method comprising:
generating real-time related timing information by the first communication entity;
operating hardware components of the first communication entity and of the second communication entity, when processing data samples, based on the generated real-time related timing information;
transmitting, within the second communication entity, real-time related communication messages including a time stamp indicative of a time at which a corresponding operation is to be executed, the time stamp generated based on the real-time related timing information generated by the first communication entity;
triggering operation of hardware components of the second communication entity at a point of time at which a sample is received; and
executing operation of the hardware components of the second communication entity at the time indicated in a corresponding time stamp.

15. A computer program product stored in a non-transitory computer readable medium for processing data samples by a first and second communication entities of a communication device which are communicatively coupled in accordance with a digital protocol, the computer program product comprising software instructions which, when run on a processor, causes the communication device to:
generate real-time related timing information by the first communication entity;
operate hardware components of the first communication entity and of the second communication entity, when processing data samples, based on the generated real-time related timing information;
transmit, within the second communication entity, real-time related communication messages including a time stamp indicative of a time at which a corresponding operation is to be executed, the time stamp generated based on the real-time related timing information generated by the first communication entity;
trigger operation of hardware components of the second communication entity at a point of time at which a sample is received; and
execute operation of the hardware components of the second communication entity at the time indicated in a corresponding time stamp.

* * * * *